J. L. JENKINS.
ATTACHMENT FOR CULTIVATORS.
APPLICATION FILED JUNE 17, 1910.
974,670.
Patented Nov. 1, 1910.
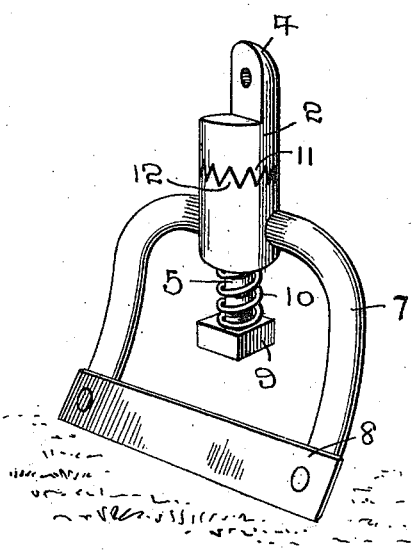
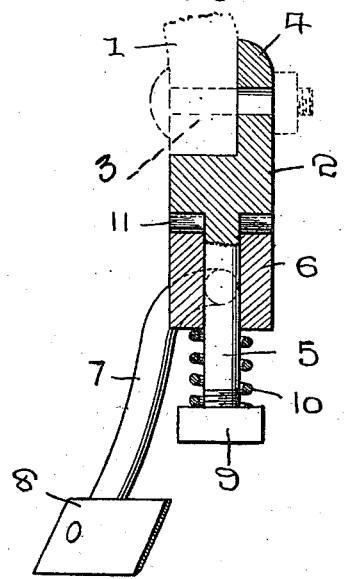
WITNESSES:
INVENTOR
J. L. Jenkins
BY
W. J. FitzGerald
Attorneys

UNITED STATES PATENT OFFICE.

JAMES L. JENKINS, OF JOHNSTOWN, WEST VIRGINIA.

ATTACHMENT FOR CULTIVATORS.

974,670.  Specification of Letters Patent.  Patented Nov. 1, 1910.

Application filed June 17, 1910. Serial No. 567,467.

*To all whom it may concern:*

Be it known that I, JAMES L. JENKINS, a citizen of the United States, residing at Johnstown, in the county of Harrison and State of West Virginia, have invented certain new and useful Improvements in Attachments for Cultivators; and I do hereby declare the following to be a full, clear, and exact description of the invention, such as will enable others skilled in the art to which it appertains to make and use the same.

My invention relates to new and useful improvements in attachments for cultivators and my object is to provide means for attaching a shovel or blade to the shank of the cultivator.

A further object is to provide means for shifting the angle of the blade with respect to the shank without disengaging the blade from the shank, and a further object is to provide means for holding the blade in its adjusted position.

Other objects and advantages will be hereinafter referred to and more particularly pointed out in the specification hereunto annexed.

In the accompanying drawings which are made a part of this application, Figure 1 is a perspective view of the blade or shovel removed from the shank of the cultivator, and, Fig. 2 is a vertical central sectional view thereof.

Referring to the drawings in which similar reference numerals designate corresponding parts throughout the several views, 1 indicates the shank of a cultivator, which may be constructed in the usual or any preferred form and 2 indicates an auxiliary shank, which is attached to the shank of the cultivator in any preferred manner, as by means of a bolt 3, shown in dotted lines in Fig. 2, said bolt extending through a wing 4 on the upper end of the auxiliary shank.

Depending from the auxiliary shank is a shaft 5, around which extends a socket 6 carried by a yoke 7, said yoke being adapted to carry the cultivating blades or shovels 8. The shaft 5 is of sufficient length to extend below the socket 6 and is threaded at its lower end to receive a nut 9 and between the nut and lower end of the socket and surrounding the shaft 5 is a spring 10, which spring is adapted to normally hold the upper end of the socket in engagement with the lower end of the auxiliary shank.

The lower end of the auxiliary shank 2 and the upper end of the socket 6 are provided with radiating teeth 11 and 12 respectively, which are adapted to intermesh with each other and prevent rotation of the socket until such time as the socket is moved away from the auxiliary shank.

The arms of the yoke 7 are extended outwardly from opposite faces of the socket and are then curved downwardly and forwardly, so that the blades 8 will extend forwardly of the shaft 5 and in view of the curvature of the shank of the cultivator, the blades will be positioned so as not to enter the ground a great distance, this device being primarily a surface cultivator. The length of the blade is such as to cover most of the space between the rows of growing plants. Instead of providing a blade which extends from one arm of the yoke to the other, each arm may be provided with a blade and by setting the blades at an angle, they may be used for hilling potatoes or cultivating on opposite sides of the row of plants.

When it is desired to change the angle of the blade with respect to the auxiliary shank, the socket 6 is lowered on the shaft until the teeth are disengaged from each other, when the socket is rotated the proper distance and released, whereupon the spring will again engage the teeth of the socket with the teeth of the auxiliary shank and thus hold the blade in its adjusted position.

When the device is being used, the blade passes just below the surface of the ground and thereby severs all grass, weeds, etc., growing between the rows and in view of the slight inclination of the blade, the grass, etc., will pass over the blade and between the arms of the yoke, thus leaving the blades of the grass upon the top of the ground, where they will soon be killed by the effects of the sun thereon.

What I claim is:—

A cultivator attachment, comprising a shank having a shaft depending therefrom and the lower edges of said shank provided with vertically arranged teeth, said shank being also provided with an upwardly extending wing adapted for engagement with the cultivator shank, a socket slidably and rotatably mounted on said shaft, said socket being provided on its upper edges with vertically disposed teeth adapted for engagement with the teeth of said shank, a yoke integral with said socket, the arms of said yoke being curved downwardly and extended forwardly of said socket, a blade mounted on the lower ends of said yoke, a nut adjustably secured to the lower free end of said shaft, and a spring encompassing said shaft between said nut and the lower end of said socket and adapted to exert upward pressure thereon, whereby said socket will be normally held in position with relation to said shank.

In testimony whereof I have signed my name to this specification in the presence of two subscribing witnesses.

JAMES L. JENKINS.

Witnesses:
  M. E. SHUTTLEWORTH,
  R. M. SHUTTLEWORTH.